V. A. STASER.
VEHICLE WHEEL.
APPLICATION FILED DEC. 18, 1914.
1,247,591.
Patented Nov. 20, 1917.
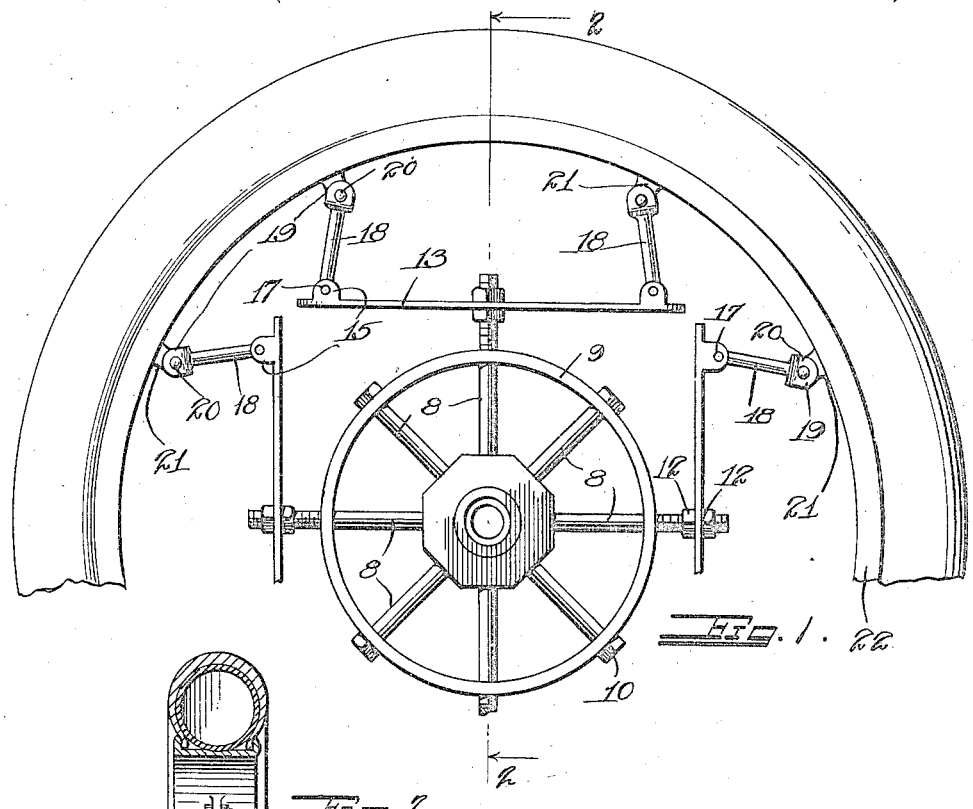
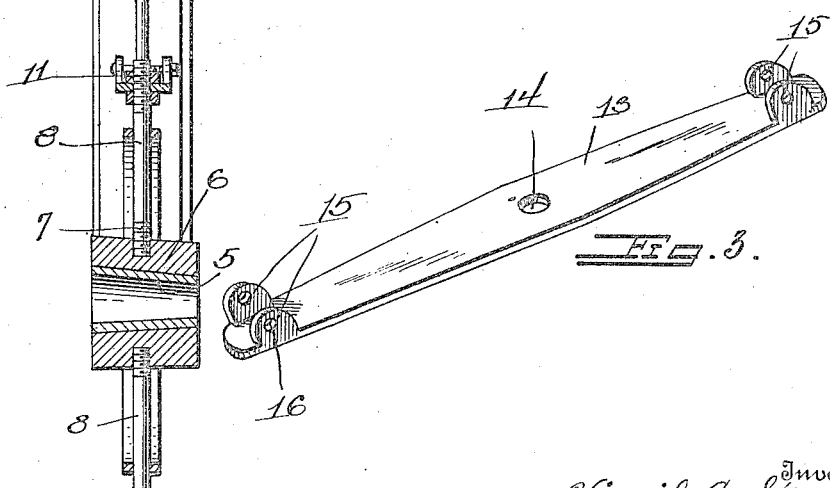
Witnesses
Edw. S. Hall.
C. W. Phenbold
Inventor
Virgil A. Staser.
By Richard Owen.
Attorney

UNITED STATES PATENT OFFICE.

VIRGIL A. STASER, OF CLEARWATER, FLORIDA.

VEHICLE-WHEEL.

1,247,591.    Specification of Letters Patent.    Patented Nov. 20, 1917.

Application filed December 18, 1914. Serial No. 877,922.

*To all whom it may concern:*

Be it known that I, VIRGIL A. STASER, a citizen of the United States, residing at Clearwater, in the county of Pinellas and State of Florida, have invented certain new and useful Improvements in Vehicle-Wheels, of which the following is a specification.

This invention relates to vehicle wheels, and more particularly relates to a wheel providing resilient connections between the outer rim and the hub, such wheel being particularly adapted for use in connection with self-propelled vehicles or automobiles, capable of attaining a high rate of speed.

As a principal object, this invention contemplates the provision of a balanced resilient connection between the outer rim of an automobile wheel and the hub of said wheel, such balanced resilient construction permitting a longitudinal differential movement of the hub and the rim as well as effectually providing a means for absorbing road shocks incident to fast travel or hard travel.

An object of equal importance with the foregoing is to construct a wheel of this type in which, if desired the ordinary pneumatic tubing may be dispensed with, such wheel to be constructed with that regard to proportion, number and arrangement of parts as to permit the same to be cheaply manufactured as well as durable and efficient in operation.

The above and additional objects which will become apparent as this explanatory description proceeds are accomplished by such means as are illustrated in the accompanying drawings, described in the following specification, and then more particularly pointed out in the claim, which is appended hereto and forms a part of this application.

With reference to the drawings, wherein there is illustrated the preferred embodiment of this invention as it is reduced to practice, and throughout the several views of which like characters of reference designate similar parts:—

Figure 1 is a fragmental elevational view of the vehicle wheel comprehended by this invention, Fig. 2 is a vertical sectional view taken on the plane indicated by the line 2—2 of Fig. 1, and Fig. 3 is a view in perspective illustrating one of the plate spring members.

The vehicle wheel under contemplation by this invention may include the central conical hub 5 of any approved construction which is adapted to be surrounded by a suitable core 6 in which are received the threaded ends 7 of spokes 8 which radiate from the inner hub to pierce a surrounding adjacent circular rim 9 being secured thereto by nuts 10 upon their outward threaded extremities 11. This construction applies to certain of the spokes 8, alternate ones however being prolonged through the rim 9 and secured by means of adjustable nuts 12 in fixed position to a spring plate 13 as illustrated in perspective in Fig. 3.

This spring plate is provided with the central aperture 14 and adjacent each end is formed with a pair of integral right angular lugs 15 which are transversely apertured as at 16 to receive pins 17 for the securement of rods 18, the latter of which are provided at their opposite extremities with bifurcations 19 also pivotally secured as at 20 to suitable lugs 21 carried inwardly of the vehicle wheel rim 22. The chord of that portion of the inner rim arc spacing the ears 21 which are connected to the same plate 13 is slightly less than the distance longitudinally of the plate between the opposite pairs of ears 15 so that the rods 18 are given an inwardly and oppositely inclined appearance as clearly illustrated in the upper portion of Fig. 1.

It will thus be seen that the inner hub of the vehicle wheel is floatingly independent of the outer rim 22 although normally maintained concentrically with the latter by the balanced action of the spring plates 13. When the wheel is moving however, each spring plate as it arrives at the lowermost position in its circle of revolution will be somewhat distorted with relation to the outer rim 22 by pivotal movement upon the lugs 21, presumably in a direction opposite to the line of travel of the wheel. The advantage of this is that, should the wheel strike an obstruction in the road, the spring plate will be afforded a forward movement capable of accommodating, unchecked, the forward travel of the axle even though the wheel is momentarily halted, so that shocks and jars of meeting such obstructions by the wheel are not transmitted to the vehicle through the rigid axle.

This pivotal movement upon the legs 18 is supplemented by an up and down resiliency by the spring plate itself when in the lowermost position of its orbit, the combined structure serving to more readily distribute the force of impact between the wheel and an obstruction. The opposite and inward inclinations of the stems 18 of each pair permit one of these to approximate a perpendicular position with regard to the spring plate even when the inclination of the other is increased.

It will be observed that a resilient structure has been evolved for a wheel construction which may dispense with the pneumatic tire if so desired although as illustrated such pneumatic tubing may be provided if thought best, this wheel taking up the shocks incident to sudden starting or stoppage of the vehicle as well as the shocks of meeting obstructions upon the path of the vehicle as no pneumatic tire can do.

While in the foregoing however, there has been illustrated in the drawings and described in the specification such combination and arrangement of elements as constitute the preferred embodiment of this invention, it is desired to emphasize the fact that such minor changes in the matters of proportion and degree may be made in later adaptations of this device, as shall not alter the spirit of the invention as defined in the appended claim.

What is claimed is:—

A spring wheel comprising a rim, a plurality of spaced pairs of lugs on the inner periphery of said rim, a hub member including a plurality of radial projections corresponding in number to the number of the aforesaid pairs of lugs, a leaf spring rigidly secured to each of said projections at a point on the spring intermediate its ends, a rigid link pivotally connecting each end of said spring to the adjacent lug, the links at the opposite ends of each spring converging in the direction of the rim.

In testimony whereof I affix my signature in presence of two witnesses.

VIRGIL A. STASER.

Witnesses:
J. C. BLACKBURN,
JNO. P. SUTTER.

Copies of this patent may be obtained for five cents each, by addressing the "Commissioner of Patents, Washington, D. C."